US009533619B2

(12) United States Patent
Minikey, Jr. et al.

(10) Patent No.: US 9,533,619 B2
(45) Date of Patent: Jan. 3, 2017

(54) REARVIEW MIRROR ASSEMBLY

(71) Applicant: Gentex Corporation, Zeeland, MI (US)

(72) Inventors: Danny L. Minikey, Jr., Fenwick, MI (US); Mark R. Roth, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/615,049

(22) Filed: Feb. 5, 2015

(65) Prior Publication Data

US 2015/0221223 A1   Aug. 6, 2015

Related U.S. Application Data

(60) Provisional application No. 61/936,149, filed on Feb. 5, 2014.

(51) Int. Cl.
*B60Q 1/00*   (2006.01)
*B60R 1/00*   (2006.01)
*B60R 1/08*   (2006.01)
*B60R 1/12*   (2006.01)

(52) U.S. Cl.
CPC ............... *B60R 1/006* (2013.01); *B60R 1/088* (2013.01); *B60R 1/12* (2013.01); *B60R 1/1207* (2013.01); *B60R 2001/1215* (2013.01)

(58) Field of Classification Search
CPC ............. B60R 1/00; B60R 1/088; B60R 1/12; B60R 2001/1215; H04N 7/181
USPC ................... 340/435, 904; 362/494; 359/267
See application file for complete search history.

(56) References Cited

U.S. PATENT DOCUMENTS

| | | | | |
|---|---|---|---|---|
| 5,786,772 | A * | 7/1998 | Schofield | B60R 1/12 180/167 |
| 8,154,418 | B2 * | 4/2012 | Peterson | B60R 1/12 340/425.5 |
| 8,508,383 | B2 * | 8/2013 | Peterson | B60R 1/12 340/815.4 |
| 9,056,584 | B2 * | 6/2015 | Fish, Jr. | B60R 1/025 |
| 9,134,585 | B2 * | 9/2015 | Tonar | G02F 1/157 |

* cited by examiner

*Primary Examiner* — John A Tweel, Jr.
(74) *Attorney, Agent, or Firm* — Price Heneveld LLP; Bradley D. Johnson

(57) ABSTRACT

A rearview mirror assembly includes a reflective mirror element and a blind spot indicator system in optical communication with the reflective mirror element and configured to receive an input from a blind spot detector system, wherein the blind spot indicator system includes a first indicator assembly and a second indicator assembly each having a light source and an optic, the optic is in optical communication with the light source. The light sources are configured to emit light that at least partially propagates through the optics and the reflective mirror element if the input received from the blind spot detector indicates the blind spot detector is active or an object is detected in the blind spot.

20 Claims, 6 Drawing Sheets

REARVIEW MIRROR ASSEMBLY

CROSS-REFERENCE TO RELATED APPLICATION

This application claims priority under 35 U.S.C. §119(e) to U.S. Provisional Patent Application No. 61/936,149, filed on Feb. 5, 2014, entitled "REARVIEW MIRROR ASSEMBLY," which is incorporated herein by reference in its entirety.

FIELD OF THE INVENTION

The present invention generally relates to an automotive rearview mirror assembly, and more particularly, to an automotive rearview mirror assembly with a blind spot indicator.

BACKGROUND OF THE INVENTION

A blind spot detection system for a vehicle can detect the presence of another vehicle or object in the lane next to or approaching the host vehicle. As a vehicle approaches the host vehicle and enters into the blind spot, a visual indicator can indicate to the driver that another vehicle or object has been detected.

SUMMARY OF THE INVENTION

According to one aspect of the present invention, a rearview mirror assembly in communication with a blind spot detector system for a vehicle, the rearview mirror assembly includes a reflective mirror element and the blind spot indicator system in optical communication with the reflective mirror element and configured to receive an input from the blind spot detector system, wherein the blind spot indicator system includes a first indicator assembly and a second indicator assembly. The first indicator assembly includes a first light source and a high intensity optic in optical communication with the first light source. The first light source is configured to emit light that at least partially propagates through the high intensity optic and the reflective mirror element if an input is received from the blind spot detector system that indicates an object is detected. The second indicator assembly includes a second light source and a diffuser optic in optical communication with the second light source. The second light source is configured to emit light that at least partially propagates through the diffuser optic and the reflective mirror element if the input from the blind spot detector system indicates the blind spot detector is active.

According to another aspect of the present invention, a rearview mirror assembly in communication with a blind spot detector system, the rearview mirror system includes a reflective mirror element, and the blind spot indicator system in optical communication with the reflective mirror element and configured to receive an input from a blind spot detector, wherein the blind spot indicator system includes a first indicator assembly and a second indicator assembly. The first indicator assembly includes a first light source and a high intensity optic in optical communication with the first light source, wherein the first light source is configured to emit light that at least partially propagates through the high intensity optic and the reflective mirror element if an input received from the blind spot detector system indicates an object is detected in the blind spot. The second indicator assembly includes a second light source and a diffuser optic in optical communication with the second light source, wherein the second light source is configured to emit light that at least partially propagates through the diffuser optic and the reflective mirror element if the input received from the blind spot detector indicates the blind spot detector is active and an indicia in optical communication with at least one of the first and second light sources, wherein the indicia is configured to block at least a portion of the light emitted from the first and second light sources and the indicia is viewable through the reflective mirror element.

According to one aspect of the present invention, a rearview mirror assembly in communication with a blind spot detector system, the rearview mirror assembly includes a reflective mirror element and the blind spot indicator system in optical communication with the reflective mirror element and configured to receive an input from a blind spot detector system, wherein the blind spot indicator system includes a first indicator assembly and a second indicator assembly. The first indicator assembly includes a first light source and a high intensity optic in optical communication with the first light source. The first light source is configured to emit light that at least partially propagates through the high intensity optic and the reflective mirror element if an input received from the blind spot detector system indicates an object is detected in a first area with respect to the vehicle. The second indicator assembly includes a second light source and a diffuser optic in optical communication with the second light source. The second light source is configured to emit light that at least partially propagates through the diffuser optic and the reflective mirror element if the input received from the blind spot detector system indicates an object is detected in a second area with respect to the vehicle.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1A:
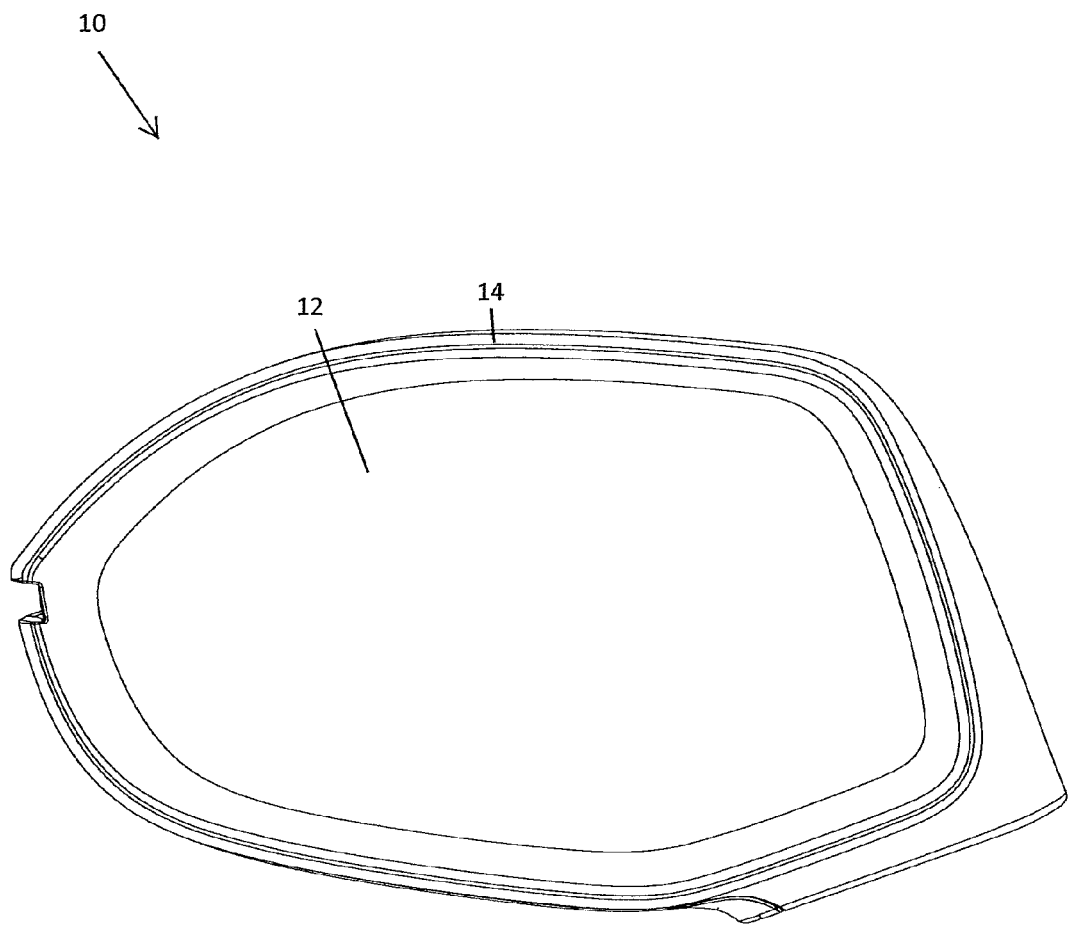
FIG. 1A is a front view of a rearview mirror assembly in accordance with at least one embodiment of the present invention.
Figure 1B:
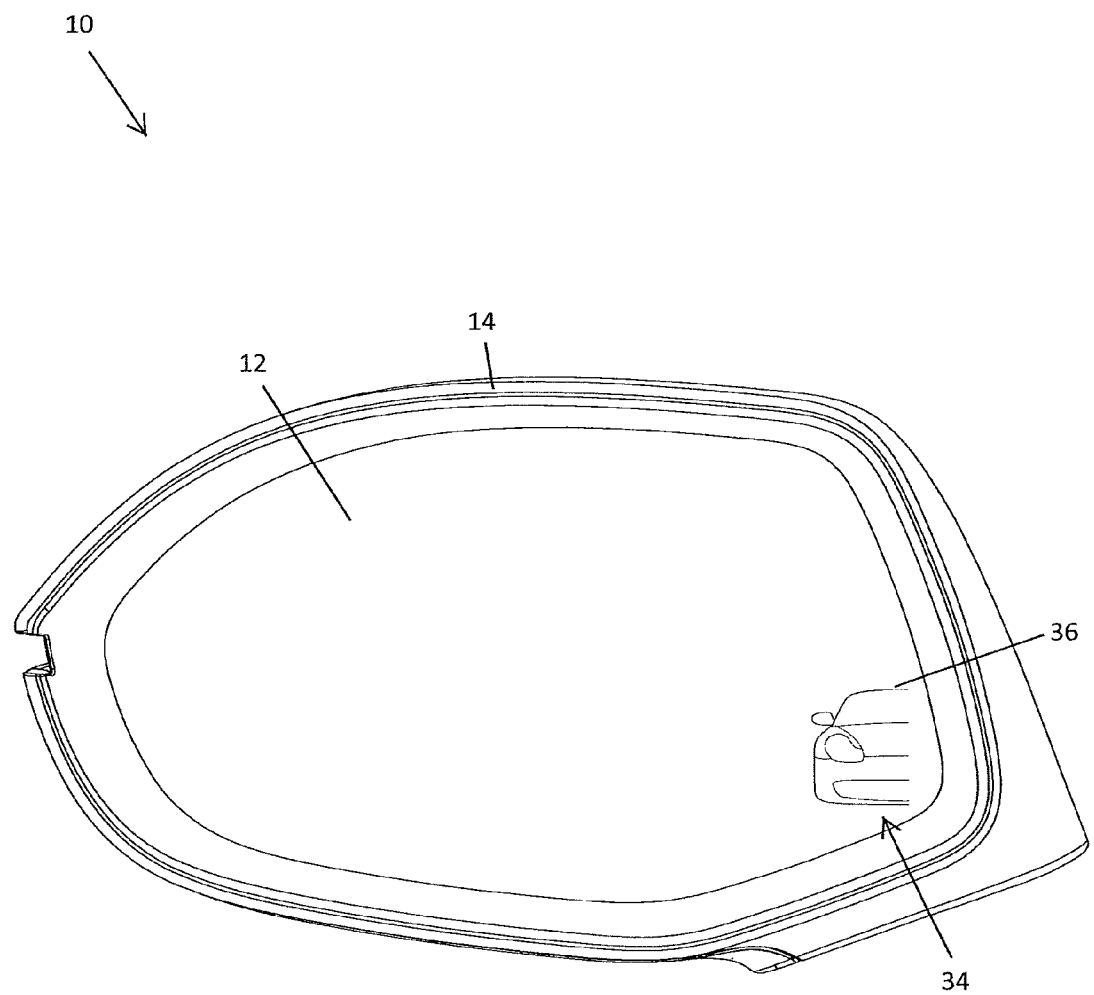
FIG. 1B is a front view of a rearview mirror assembly in accordance with at least one embodiment of the present invention.

The present illustrated embodiments reside primarily in combinations of method steps and apparatus components related to a rearview mirror assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

A rearview mirror assembly 10 in communication with a blind spot detector system, the rearview mirror assembly 10 includes a reflective mirror element 12 and a blind spot indicator system 16 in optical communication with the reflective mirror element 12 and configured to receive an input from a blind spot detector system. The blind spot indicator system 16 includes a first indicator assembly 20 and a second indicator assembly 28. The first indicator assembly 20 having a first light source 22 and a high intensity optic 26 in optical communication with the first light source 22. The first light source 22 is configured to emit light that at least partially propagates through the high intensity optic 26 and the reflective mirror element 12 if the input received from the blind spot detector system indicates an object is detected. The second indicator assembly 28 having a second light source 30 and a diffuser optic 32 in optical communication with the second light source 30. The second light source 30 is configured to emit light that at least partially propagates through the diffuser optic 32 and the reflective mirror element 12 if the input received from the blind spot detector system indicates the blind spot detector system is active, as described in greater detail herein.

For purpose of explanation and not limitation, the rearview mirror assembly 10 can be used with a blind spot detector system that uses one or more sensor systems, such as radar, or one or more cameras, to detect a vehicle or object in the blind spot of an automobile. The blind spot indicator system 16 can be used to indicate the blind spot detector system is active, the location of the adjacent vehicle, or a combination thereof.

Figure 1C:
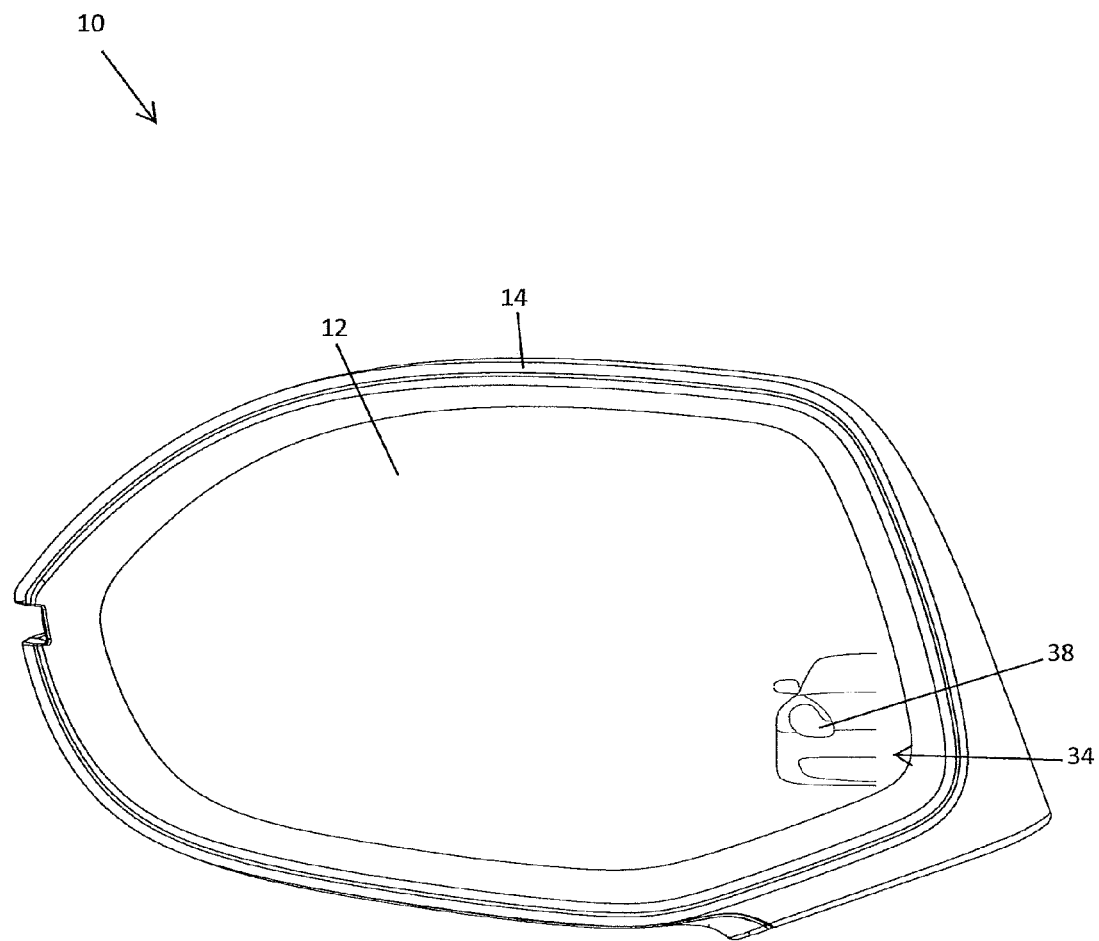
FIG. 1C is a front view of a rearview mirror assembly in accordance with at least one embodiment of the present invention.
Figure 1D:
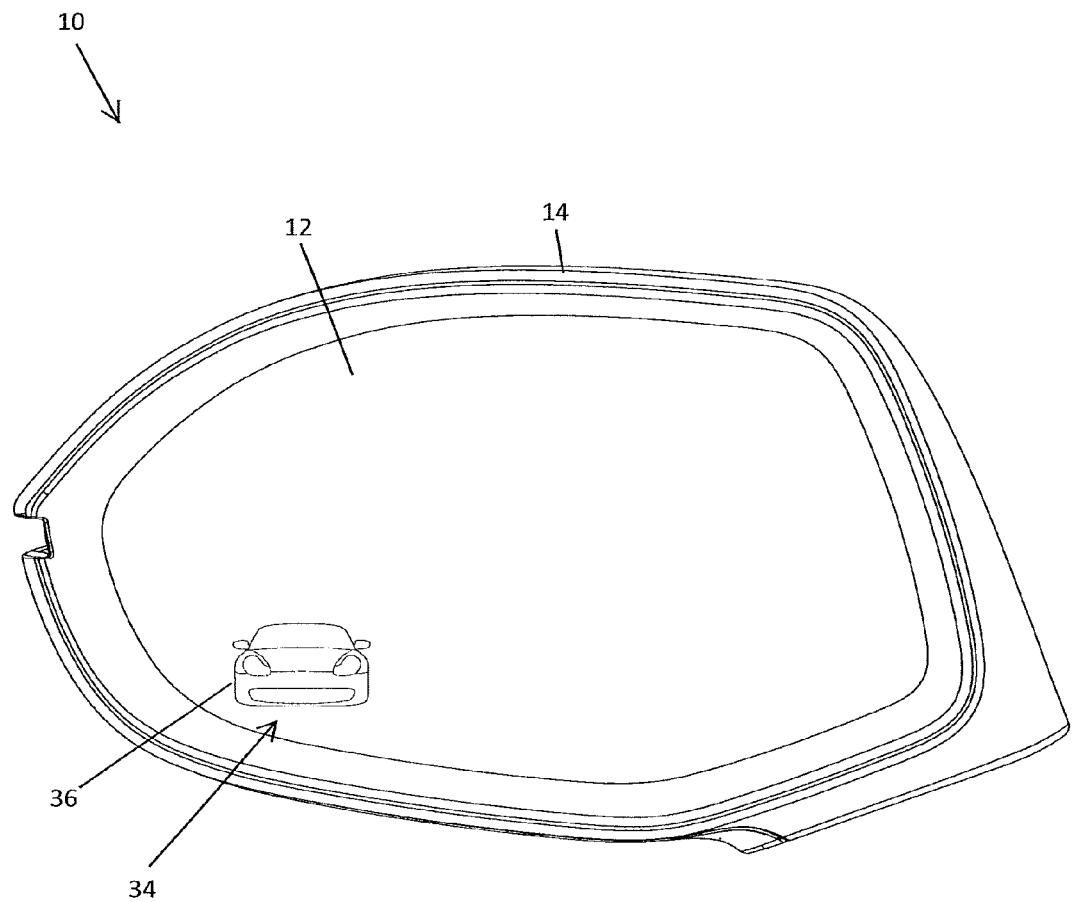
FIG. 1D is a front view of a rearview mirror assembly in accordance with at least one embodiment of the present invention.
Figure 1E:
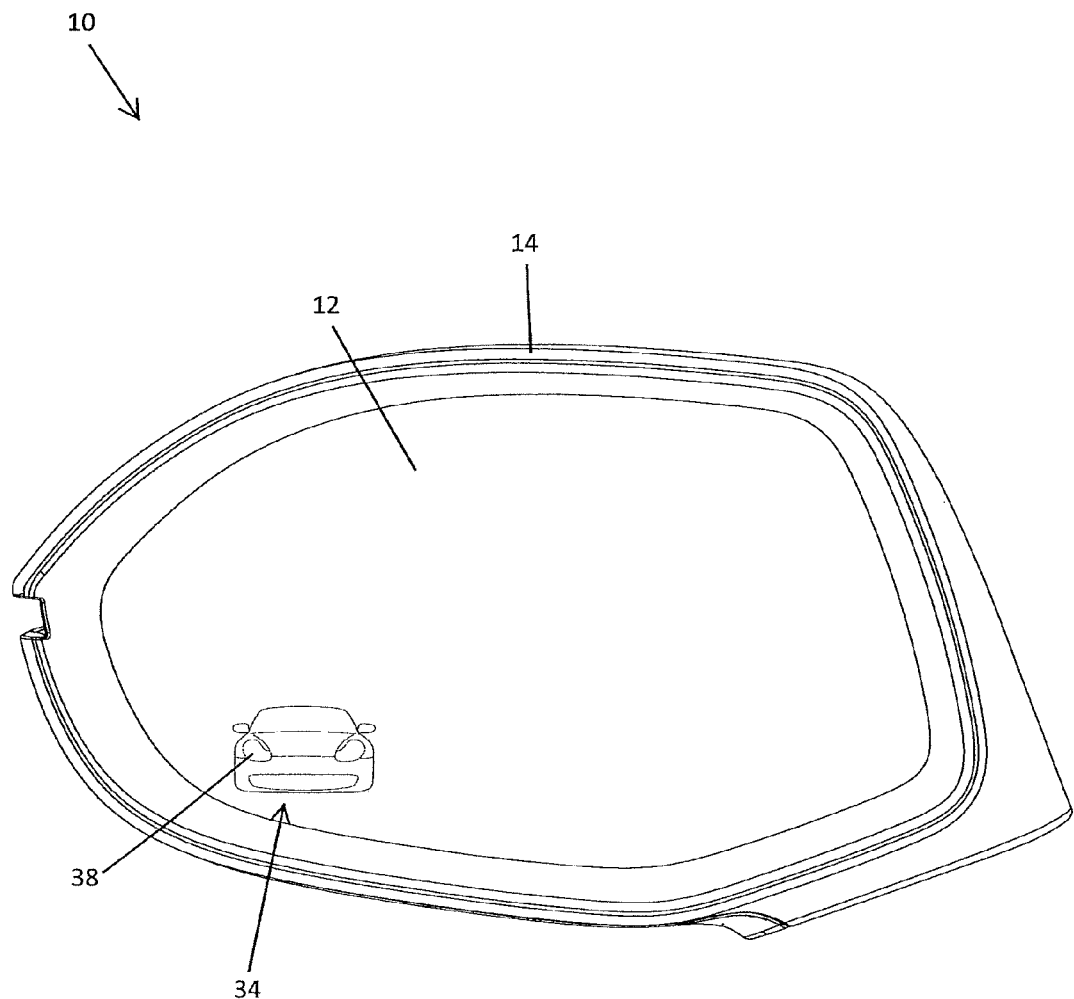
FIG. 1E is a front view of a rearview mirror assembly in accordance with at least one embodiment of the present invention.
Figure 2:
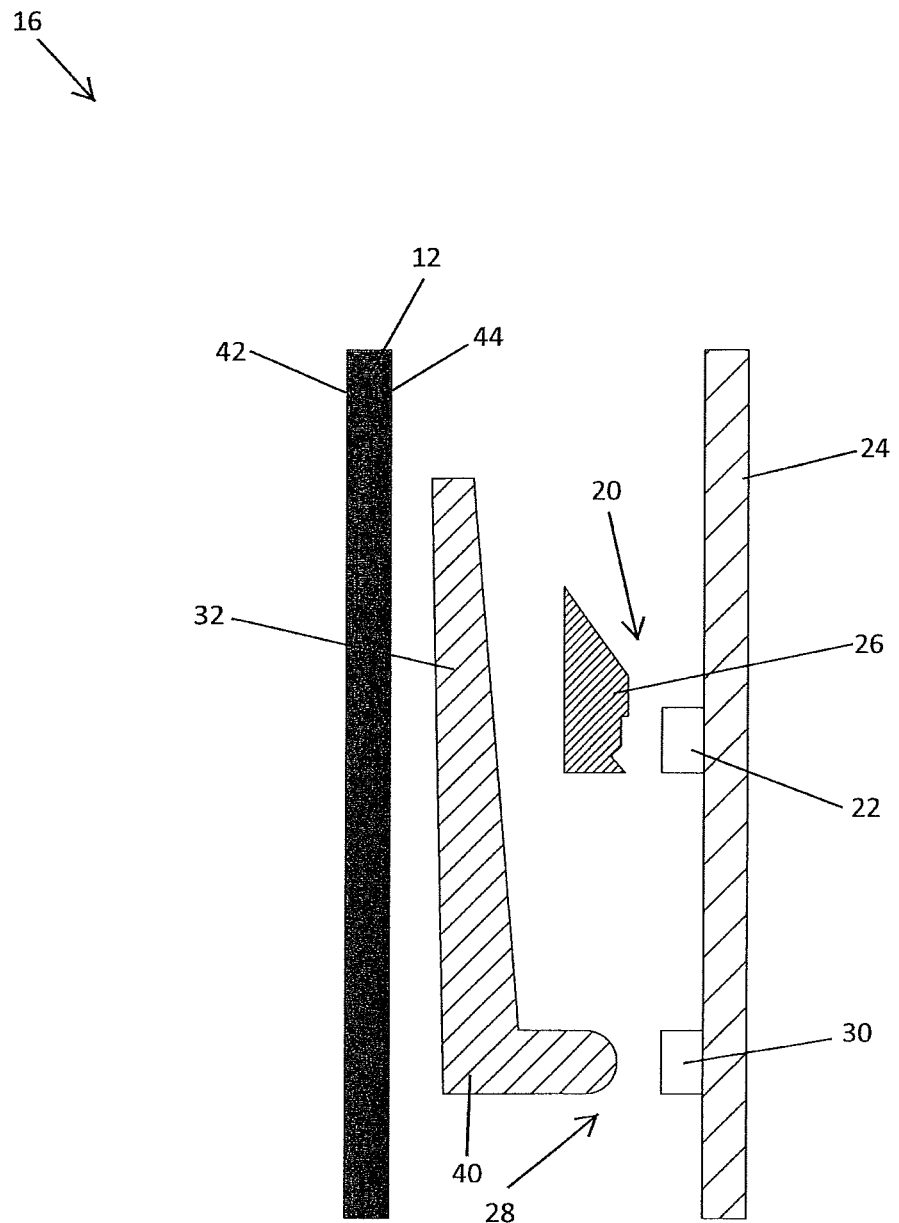
FIG. 2 is a cross-sectional view of a rearview mirror assembly in accordance with at least one embodiment of the present invention.

With respect to FIGS. 1A-2, a rearview mirror assembly is generally shown at reference identifier 10. The rearview mirror assembly can include a reflective mirror element 12 that can have a first surface 42 and second surface 44. The reflective mirror element can include a reflective coating on the first surface 42 or second surface 44 wherein the reflective coating can at least partially define an icon in optical communication with at least one light source. The reflective element 12 can be an electro-optic mirror assembly having two substrates each having a first surface and a second surface, that form a cavity that is at least partially filed with an electro-optic medium (e.g., electrochromic medium). The reflective mirror element 12 can include a transflective surface on one of the first surface 42 and second surface 44.

The blind spot indicator system 16 can have a first indicator assembly 20 with a first light source 22 and a high intensity optic 26. The first light source 22 can include at least one light emitting diode (LED). The first light source 22 can emit light that at least partially propagate through the high intensity optic 26 and the reflective mirror element 12. The blind spot indicator system 16 can have a second indicator assembly 28 with a second light source 30 and a diffuser optic 32. The second light source 30 can include at least one LED or the second light source 30 can include a light pipe. The second light source 30 can emit light that at least partially propagates through the diffuser optic 32 and the reflective mirror element 12. The blind spot indicator system 16 can include an indicia 34 that is in optical communication with the first 22 and second 30 light sources. The indicia 34 can block at least a portion of light emitted from at least one of the first 22 and second 30 light sources. The indicia 34 can be on the first surface 42 or second surface 44 of the reflective mirror element 12 and is visible to the driver of the vehicle when at least one of the first light source 22 and the second light source 30 are illuminated.

A vehicle blind spot indicator system 16 can display indications based upon objects being detected by a blind spot detector system. The blind spot indicator system 16 can be positioned included in a rearview mirror assembly 10 and can produce an indication of the presence of an object adjacent the corresponding side of the vehicle. If an object is detected on the left side of the vehicle the indicator on the left exterior mirror or interior mirror assembly is illuminated to notify the driver of the detected object. If an object is detected on the right side of the vehicle the indicator on the right exterior mirror or interior mirror assembly is illuminated to notify the driver of the detected object.

In reference to FIGS. 1A-2, the rearview mirror assembly 10 can include the reflective mirror element 12 at least partially enclosed by the housing 14. The reflective mirror element 12 can have an indicia 34 configured to at least partially block light emitted by at least one of the first light source 22 and the second light source 30, such that at least a portion of the emitted light propagates through the reflective mirror element 12. The rearview mirror assembly 10 can include the blind spot indicator system 16, which includes the first indicator assembly 20. The first indicator assembly 20 includes the first light source 22 electrically connected to a PCB 24. The first indicator assembly 20 can further include a high intensity optic 26. The first light source 22 emits light that at least partially propagates through the high intensity optic 26 and the reflective mirror element 12. The first light source 22 can work in conjunction with the high intensity optic 26 to alert the driver of an object in the blind spot. The blind spot indicator system 16 can further include the second indicator assembly 28. The second indicator assembly 28 can include a second light source 30 electrically connected to the PCB 24. The second indicator assembly 28 can further include a diffuser optic 32. The second light source 30 can emit light that at least partially propagates through the diffuser optic 32 and the reflective mirror element 12. The second light source 30 can work in conjunction with the diffuser optic 32 to notify the driver that the blind spot indicator system 16 is activated. The indicia 34 can be in optical communication with the first light source 22 and the second light source 30 and can block at least a portion of the light emitted from at least one of the first light source 22 and the second light source 30.

With reference again to FIGS. 1A-1E, FIG. 1A shows the rearview mirror assembly 10 with the blind spot indication system 16 in the off or deactivated state. The blind spot indicator system 16 can include two illumination stages as shown in FIG. 1B-E. The first illumination stage can be initiated to show that the blind spot detector system is activated and working or to notify the driver that an object is detected in a first area with respect to the vehicle (e.g., approaching or exiting the blind spot of their vehicle). An example of the first illumination stage can be illuminating the outline of the automobile indicia 36 (FIGS. 1B and 1D) on the rearview mirror element 12. The automobile outline 36 becomes illuminated once the light source 30 is activated and the emitted light at least partially propagates through the diffuser optic 32 and the reflective mirror element 12. Once an object is detected in the blind spot of the vehicle or an object is detected in a second area with respect to the vehicle, an input signal is again sent to the blind spot indicator system 16 (FIGS. 1C and 1E). Upon receiving the input, a second illumination stage can be initiated. An example of the second illumination stage can be the illumination of the headlights of the automobile indicia 38 on the rearview mirror element 12. The headlights of the automobile indicia 38 are illuminated at a higher intensity than the outline of the automobile 36 and the headlights 38 become illuminated once the light source 22 is activated and the emitted light at least partially propagates through the high intensity optic 26 and the reflective mirror element 12.

With reference now to FIG. 2, the rearview mirror assembly 10 includes the first indicator assembly 20 and the second indicator assembly 28. The second indicator assembly 28 can be illuminated to show the driver that the blind spot indicator system 16 is activated. The second indicator assembly 28 can use a diffuser optic 32 and a second light source 30 to illuminate the outline of the indicia 34 to notify the driver of the activated function. As an object moves into the blind spot of the vehicle a first indicator assembly 20 can be activated, using a first light source 22 and a high intensity optic 26 to intensely illuminate at least one portion of the indicia 34, in order to clearly notify the driver there is an object detected in the blind spot.

With further reference to FIG. 2, the first 20 and second 28 indicator assemblies can be located between the PCB 24 and the reflective mirror element 12. The diffuser optic 32 can be located closer to the reflective glass element 12 that the high intensity optic 26. When the second light source 30 is illuminated the driver of the vehicle will be able to view the indicia 34 which can be located on the first surface 42 or second surface 44 of the reflective mirror element 12. A light pipe portion 40 can be configured to communicate the light from the second light source 30 to the diffuser optic 32. As an object moves into the vehicle blind spot, the first light source 22 can be illuminated which emit light into the high intensity optic 26 which can be configured to communicate the emitted light towards the indicia 34. The first indicator assembly 20 can be configured to emit light of a greater intensity when viewed through the reflective element 12 than the second indicator assembly 28. The first light source 22 can strobe, be flashed, or hold a constant illumination to notify the driver of the object detected and return to the off state once the object is no longer detected or no longer detected in the designated area.

It will be appreciated that embodiments of the invention described herein may be comprised of one or more conventional processors and unique stored program instructions that control one or more processors to implement, in conjunction with certain non-processor circuits, some, most, or all of the functions of a rearview mirror assembly, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A rearview mirror assembly, the rearview mirror assembly comprising:
    a reflective mirror element; and
    a blind spot indicator system in optical communication with the reflective mirror element, and configured to receive an input from a blind spot detector system, wherein the blind spot indicator system comprises:
        a first indicator assembly comprising:
            a first light source; and
            a high intensity optic in optical communication with the first light source;
            wherein the first light source is configured to emit light that at least partially propagates through the high intensity optic and the reflective mirror element if the input is received from the blind spot detector system indicating an object is detected; and
        a second indicator assembly comprising:
            a second light source; and
            a diffuser optic in optical communication with the second light source;
            wherein the second light source is configured to emit light that at least partially propagates through the diffuser optic and the reflective mirror element if the input is received from the blind spot detector system indicating the blind spot detector is active.

2. The rearview mirror assembly of claim 1, wherein the light emitted from the first light source and viewed through the reflective element is brighter than the light emitted from the second light source and viewed through the reflective element.

3. The rearview mirror assembly of claim 1, wherein the first indicator assembly and the second indicator assembly are illuminated approximately simultaneously.

4. The rearview mirror assembly of claim 1, wherein at least one of the first light source and the second light source comprises at least one light emitting diode.

5. The rearview mirror assembly of claim 1, wherein the reflective element is at least one of an electro-optic reflective element and an electrochromic reflective element.

6. The rearview mirror assembly of claim 1, wherein the reflective element is an exterior rearview element.

7. The rearview mirror assembly of claim 1 further comprising an indicia in optical communication with the second light source, wherein the indicia defines an automobile icon.

8. The rearview mirror assembly of claim 7 further comprising an indicia in optical communication with the first light source, wherein the indicia defines at least one headlight of the automobile icon.

9. The rearview mirror assembly of claim 1 further comprising a reflective coating on a surface of the reflective element, wherein the reflective coating defines an icon in optical communication with at least one of the first light source and the second light source.

10. The rearview mirror assembly of claim 1 further comprising a transflective coating on a surface of the reflective element.

11. The rearview mirror assembly of claim 1, wherein at least one of the first light source and the second light source comprise a light pipe.

12. A rearview mirror assembly, the rearview mirror assembly comprising:
   a reflective mirror element;
   a blind spot indicator system in optical communication with the reflective mirror element, and configured to receive an input from a blind spot detector system, wherein the blind spot indicator system comprises:
      a first indicator assembly comprising:
         a first light source; and
         a high intensity optic in optical communication with the first light source;
         wherein the first light source is configured to emit light that at least partially propagates through the high intensity optic and the reflective mirror element if the input received from the blind spot detector system indicates an object is detected in the blind spot;
      a second indicator assembly comprising:
         a second light source; and
         a diffuser optic in optical communication with the second light source; and
         wherein the second light source is configured to emit light that at
      least partially propagates through the diffuser optic and the reflective mirror element if the input received from the blind spot detector system indicates the blind spot detector is active;
      an indicia in optical communication with at least one of the first and second light sources, wherein said indicia is configured to block at least a portion of light emitted from at least one of the first light source and the second light source and the indicia is viewable through the reflective mirror element.

13. The rearview mirror assembly of claim 12, wherein the indicia is on at least one of the first surface and the second surface of a substrate of the reflective mirror element.

14. The rearview mirror assembly of claim 12, wherein the reflective mirror element is at least one of an electro-optic reflective element and an electrochromic reflective mirror element.

15. The rearview mirror assembly of claim 12, wherein the outline of the indicia is configured to be illuminated when the light is emitted from the second light source and at least partially propagates through the diffuser optic and wherein a portion of the indicia is configured to be illuminated at a higher intensity than the outline when the light is emitted from the first light source and at least partially propagates through the high intensity optic.

16. A rearview mirror assembly, the rearview mirror assembly comprising:
   a reflective mirror element;
   a blind spot indicator system in optical communication with the reflective mirror element, and configured to receive an input from a blind spot detector system, wherein the blind spot indicator system comprises:
      a first indicator assembly comprising:
         a first light source; and
         a high intensity optic in optical communication with the first light source;
         wherein the first light source is configured to emit light that at least partially propagates through the high intensity optic and the reflective mirror element if the input is received from the blind spot detector system indicating an object is detected in a first area with respect to the vehicle;
      a second indicator assembly comprising:
         a second light source and
         a diffuser optic in optical communication with the second light source; and
         wherein the second light source is configured to emit light that at least partially propagates through the diffuser optic and the reflective mirror element if the input is received from the blind spot detector system indicating an object is detected in a second area with respect to the vehicle.

17. The rearview mirror assembly of claim 16, wherein the reflective mirror element is at least one of an electro-optic reflective element and an electrochromic reflective mirror element.

18. The rearview mirror assembly of claim 16, wherein the first light source and the second light source comprise at least one light emitting diode.

19. The rearview mirror assembly of claim 16, wherein an indicia in optical communication with the second light source is the outline of an automobile icon and the indicia in optical communication with the first light source is at least one headlight of said automobile icon.

20. The rearview mirror system of claim 16, wherein at least one of the first light source and the second light source comprises a light pipe.

* * * * *

UNITED STATES PATENT AND TRADEMARK OFFICE
CERTIFICATE OF CORRECTION

| | | |
|---|---|---|
| PATENT NO. | : 9,533,619 B2 | Page 1 of 1 |
| APPLICATION NO. | : 14/615049 | |
| DATED | : January 3, 2017 | |
| INVENTOR(S) | : Minikey, Jr. et al. | |

It is certified that error appears in the above-identified patent and that said Letters Patent is hereby corrected as shown below:

In the Claims

Column 8, Claim 16, Line 35:
After "source" insert --;--.

Signed and Sealed this
Ninth Day of May, 2017

Michelle K. Lee
*Director of the United States Patent and Trademark Office*